US009729210B2

United States Patent
Jensen et al.

(10) Patent No.: US 9,729,210 B2
(45) Date of Patent: Aug. 8, 2017

(54) CHASSIS NFC ANTENNA BOOSTER

(71) Applicant: AVAGO TECHNOLOGIES GENERAL IP (SINGAPORE) PTE. LTD., Singapore (SG)

(72) Inventors: Henrik Tholstrup Jensen, Long Beach, CA (US); Hyungpyo Lee, Seoul (KR)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/723,230

(22) Filed: May 27, 2015

(65) Prior Publication Data

US 2016/0315667 A1    Oct. 27, 2016

Related U.S. Application Data

(60) Provisional application No. 62/153,430, filed on Apr. 27, 2015.

(51) Int. Cl.
| | | |
|---|---|---|
| *H04M 1/00* | (2006.01) | |
| *H04B 5/00* | (2006.01) | |
| *H04W 4/00* | (2009.01) | |

(52) U.S. Cl.
CPC ......... *H04B 5/0081* (2013.01); *H04B 5/0031* (2013.01); *H04W 4/008* (2013.01)

(58) Field of Classification Search
CPC .. H03H 7/38; H03H 2210/025; H04B 5/0075; H04B 5/0081; H04B 5/0062; H04W 4/008
USPC ..................................... 455/562.1, 121, 274
See application file for complete search history.

(56) References Cited

U.S. PATENT DOCUMENTS

| | | | | |
|---|---|---|---|---|
| 2010/0210233 | A1* | 8/2010 | Cook | H01Q 1/243 455/270 |
| 2012/0086615 | A1* | 4/2012 | Norair | H01Q 1/44 343/720 |
| 2013/0093568 | A1* | 4/2013 | Gay | G06K 7/10237 340/10.1 |
| 2014/0252878 | A1* | 9/2014 | Jantunen | H04B 5/0031 307/104 |
| 2015/0180542 | A1* | 6/2015 | Jang | G06Q 20/3278 455/41.1 |
| 2016/0087476 | A1* | 3/2016 | Carobolante | H02J 7/025 320/108 |
| 2016/0182263 | A1* | 6/2016 | Ramakrishnan | H04L 27/04 375/300 |

* cited by examiner

*Primary Examiner* — Tu X Nguyen
(74) *Attorney, Agent, or Firm* — Oblon, McClelland, Maier & Neustadt, L.L.P.

(57) ABSTRACT

A communication device used for near filed communications (NFC). The device includes circuitry that generates a differential signal for communication with an analog front end of the device. The analog front end includes an impedance matching network and an antenna. The antenna is disposed at a predetermined distance away from the boundary of a battery compartment. The antenna forms a single loop around the battery compartment and is coupled to the matching network either in a differential manner or a single ended manner. The communication device includes a protective back casing that is either metallic or plastic in nature. With the single loop antenna configuration, both types of back covers enable efficient NFC.

16 Claims, 6 Drawing Sheets

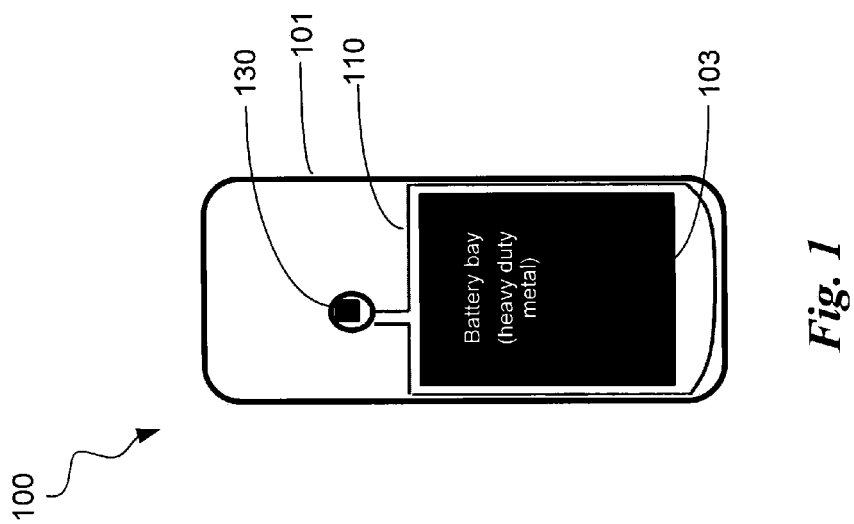

CHASSIS NFC ANTENNA BOOSTER

CROSS-REFERENCE TO RELATED APPLICATIONS

This application is based upon and claims the benefit of priority under 35 U.S.C. §119(e) from the prior Provisional U.S. Patent Application Ser. No. 62/153,430, filed on Apr. 27, 2015, the entire contents of which are herein incorporated by reference.

FIELD

Exemplary embodiments of the present disclosure relate to techniques of enhancing antenna performance for near field communication. More specifically, the exemplary embodiments relate to techniques of configuring an NFC antenna within a communication device, such that the performance of the antenna is enhanced by a metallic chassis included in the communication device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near Field Communication (NFC) is a short-range contactless communication technology, which combines non-contact sensors and wireless connectivity technology. Compared with other short-range wireless communication technology, NFC technology is more secure, and the reaction time is shorter, and therefore, very suitable for applications such as electronic wallet. Bank cards, credit cards, loyalty cards, transportation cards and other cards can be integrated in a seamless manner on a mobile phone, and are thus easy to carry and manage.

In order to obtain effective near field communication, the NFC antenna size is usually required to be large, thereby limiting the design space on the mobile device.

To address the design space problem, several original equipment manufacturers (OEMs) install the NFC antenna either within a battery of the mobile device or position a multi-turn antenna on the surface of the battery of the mobile device. However, as the batteries are made of a metallic material, eddy currents formed on the surface of the battery oppose the magnetic field of the NFC antenna, thereby leading to antenna attenuation.

Furthermore, by using an increased number of NFC antenna coil turns results in an increased thickness of the mobile device, thereby increasing production costs. Accordingly, the present disclosure provides for techniques of configuring an NFC antenna within the mobile device such that antenna performance is enhanced, while lowering manufacturing costs.

SUMMARY

An NFC communication device and an associated technique of configuring an NFC antenna within the communication device to enhance antenna performance.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 depicts according to an embodiment, an exemplary NFC antenna configuration within a communication device;

Figure 2A:
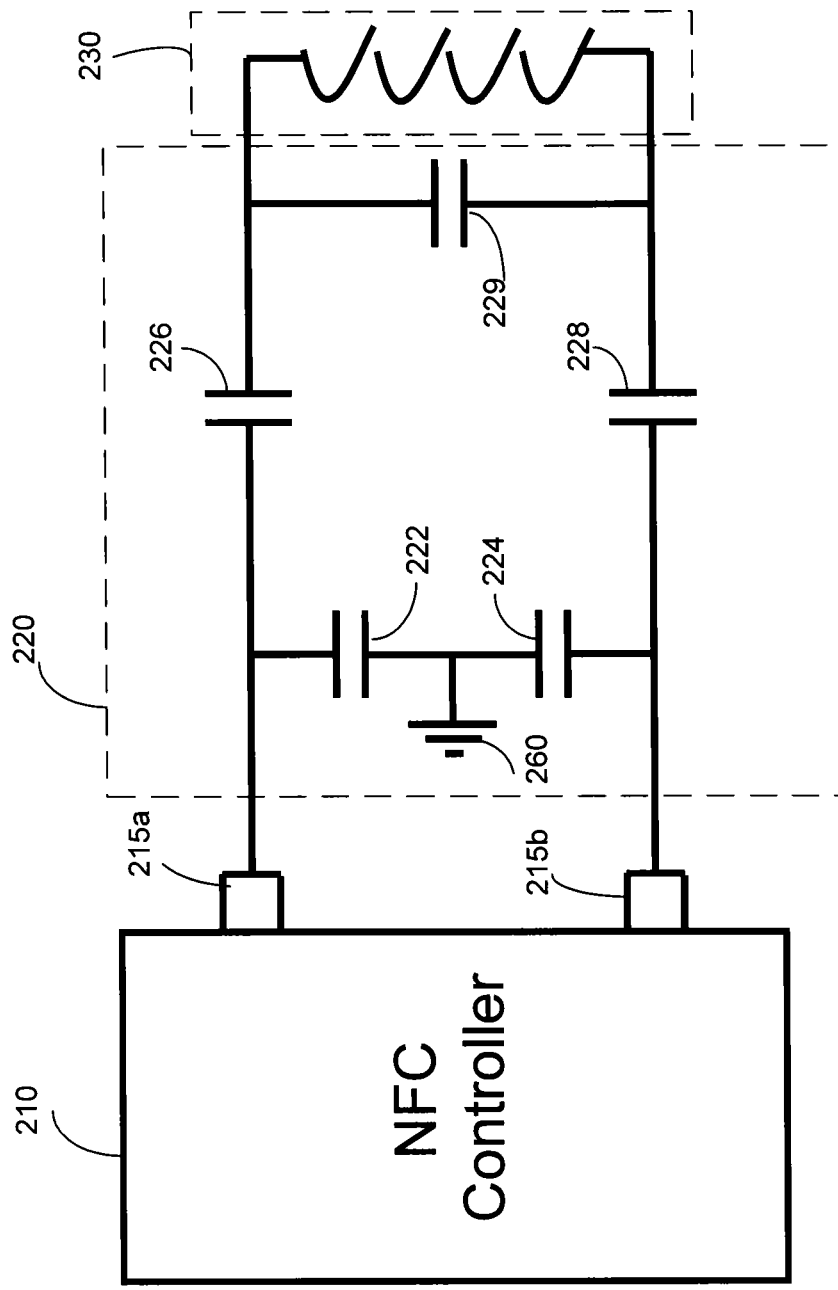
FIGS. 2A and 2B illustrate according to an embodiment, a differential NFC antenna configuration.

The drawings illustrate only example embodiments and are therefore not to be considered limiting of the scope described herein, as other equally effective embodiments are within the scope and spirit of the present disclosure. The elements and features shown in the drawings are not necessarily drawn to scale, emphasis instead being placed upon clearly illustrating the principles of the embodiments. Additionally, certain dimensions or positioning's may be exaggerated to help visually convey certain principles.

DETAILED DESCRIPTION

In the following paragraphs, the embodiments are described in further detail by way of example with reference to the attached drawings. The described embodiments are not limited in application to the examples set forth herein.

An exemplary aspect of the present disclosure provides for a communication device. The communication device includes circuitry configured to generate a differential signal for communication with an analog front end, wherein the analog front end includes a matching network and an antenna, the antenna being disposed around a boundary of a battery compartment of the communication device and the matching network coupling the antenna to the circuitry.

Another exemplary aspect of the disclosure provides for a communication device. The communication device includes a battery compartment configured to hold a battery of the communication device. The communication device also includes an antenna that is disposed around a boundary of the battery compartment and coupled at one end of the antenna to a matching network, and coupled at the other end of the antenna to a ground terminal.

In a further exemplary aspect, the present disclosure provides a communication device that includes a protective back casing, an antenna that is disposed around a boundary of a battery compartment of the communication device, a matching network, and circuitry configured to generate a differential signal for communication with the matching network, wherein the matching network couples to the circuitry at one end and couples to the antenna at the other end.

Referring now to the drawings, wherein like reference numerals designate identical or corresponding parts throughout the several views, FIG. 1 depicts according to an embodiment, an exemplary NFC antenna configuration within a communication device 100.

The communication device 100 includes a battery compartment (also referred to herein as a battery bay) 103 that is disposed substantially in a lower portion of the communication device 100 and serves as a receptacle (chassis) that holds a battery of the communication device 100. The battery compartment 103 is disposed within an outer casing 101 of the communication device and (like the battery) is made of a heavy duty metallic material such as Zinc, Cadmium, Nickel, Copper or the like.

According to one embodiment, the battery (as well as the battery compartment) does not include an NFC antenna that is installed within the battery or on its surface. Rather, as shown in FIG. 1, an NFC antenna 110 is disposed in close proximity, around the boundary of the battery compartment 103. In doing so, the effective surface area of the NFC antenna 110 is increased and moreover, eddy currents that may be induced on the metallic surface of the battery do not hinder with the magnetic field of the NFC antenna. Therefore, by removing the NFC antenna from the battery and disposing the antenna around the battery compartment offers the present disclosure the advantageous ability of lowering battery costs due to simplification in battery manufacturing.

By one embodiment, the antenna 110 surrounds the battery compartment 103, and is disposed at a distance of one millimeter away from the edge of the battery compartment 103. In such a configuration, the magnetic field of the NFC antenna 110 experiences a boost from the metallic material of the battery compartment. The antenna 110 is connected to an impedance matching network (referred to herein as a matching network) that couples to an NFC controller. The NFC controller may be implemented as a system on a chip (SoC), an integrated circuit (IC), or a plurality of SoC's and/or IC's. For the sake of convenience, the matching network and the NFC controller are depicted as 130 in FIG. 1. These components are described in detail with reference to FIGS. 2A and 2B, and FIG. 3. According to one embodiment, the NFC antenna 110 may be a wire that is looped around the battery bay. Specifically, the NFC antenna 110 is a wire that forms a single turn (i.e., a single loop) around the battery compartment 103. Alternatively, the NFC antenna 110 may be a trace that is embedded on a printed circuit board of the communication device 100.

In what follows, a detailed description regarding the matching network and techniques of coupling the antenna to the NFC controller of the communication device are described.

Figure 2B:
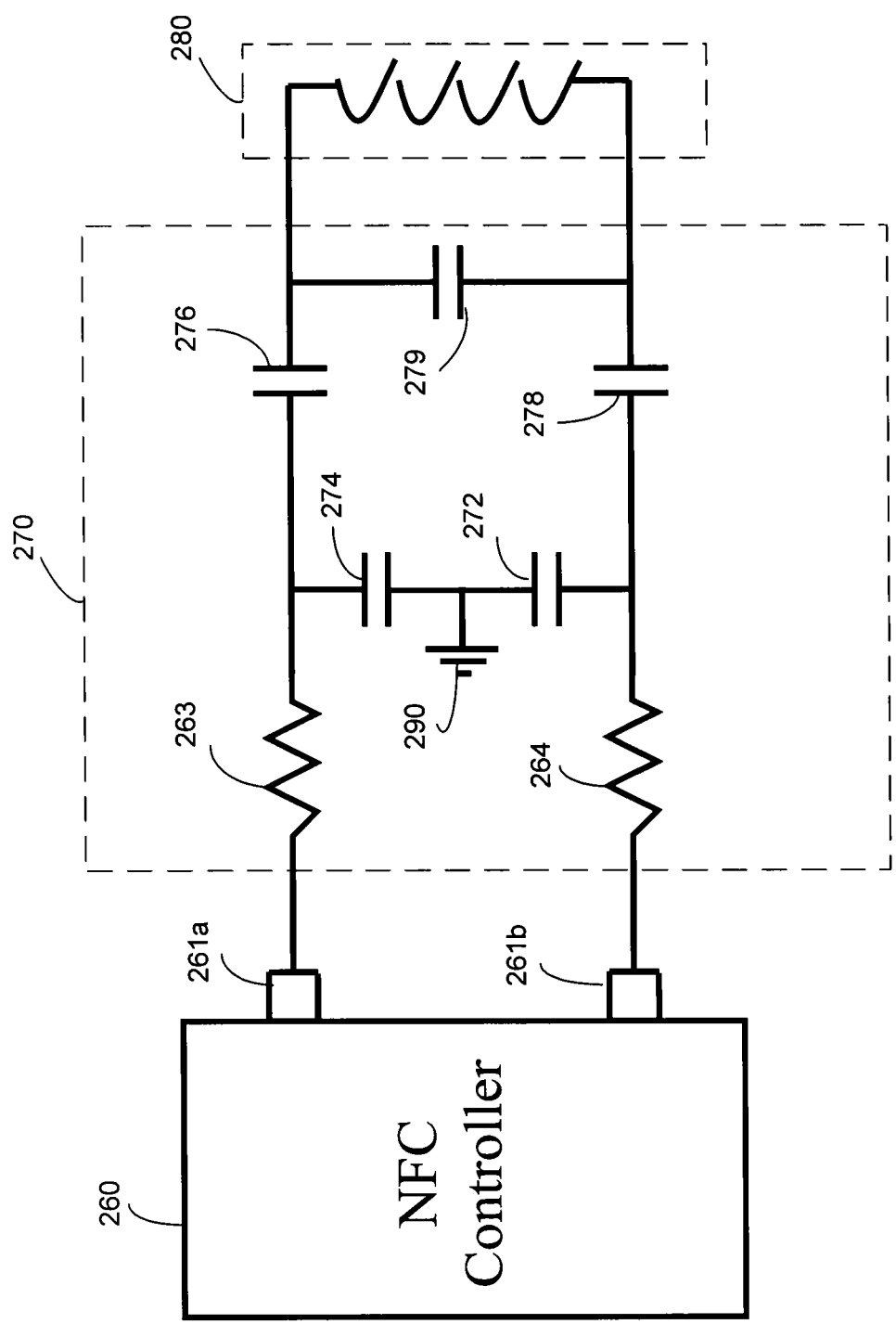

FIGS. 2A and 2B illustrate according to an embodiment, a differential NFC antenna configuration in a communication device. Specifically, FIG. 2A illustrates a differential configuration including an NFC controller 210, a matching network 220, and an antenna 230. The matching network 220 provides an impedance match between the NFC controller 210 and the antenna 230, in order to ensure maximum power transfer from the NFC controller 210 to the antenna 230. In FIG. 2A, the two ends of the antenna 230 are connected symmetrically to the matching network 220.

The NFC controller 210 includes two transmit output ports/pins labelled 215a and 215b. Note, that the two output pins 215a and 215b are not independent output pins but rather, two output pins of a single differential output. It must be appreciated that a differential output is preferred by the NFC controller 210, as the NFC controller 210 may have a small supply voltage (for instance, a 3V supply). Further, the antenna 230 is coupled in a parallel manner to a capacitor 229. Thus, the controller 210 can use a small supply voltage to drive the antenna 230 with approximately twice the voltage as compared to a scenario of using a single ended output from the NFC controller 210.

According to one embodiment, the NFC controller may generate a square wave of frequency 13.56 MHz. Thus, in order to generate a clean sine wave, the matching network 220 can include a low-pass filter. Specifically, as shown in FIG. 2A, the capacitors 222 and 224 form a low pass filter and are connected at one end to a ground terminal 260 and are connected at either ends, to the two transmit output ports 215a and 215b, respectively of the NFC controller 210. The matching network 220 further includes a capacitor 229 that is connected in a parallel manner to the antenna 230. Additionally, the matching network 220 includes capacitors 226 and 228 that are connected to the two ends of the capacitor 229, and are connected at their respective other ends directly to the two output pins 215a and 215b of the NFC controller 210.

As described later with reference to FIG. 4, the communication device may operate in one mode as an NFC reader. In such a setup, most power is transmitted when the impedance of the antenna 230 is matched to the impedance of the NFC controller 210. Accordingly, by one embodiment, the capacitors 226, 228, and 229 may transform, for instance, the impedance of the antenna to a 50 ohm impedance at resonance frequency (e.g., 13.56 MHz).

According to one embodiment, in order to receive a modulated signal from an NFC tag, the quality factor (Q-factor) of the antenna should not be very high. The Q-factor is a parameter that indicates how well the antenna performs at resonance frequency. Normally, higher the Q-factor, more power is radiated from the antenna. However, when the communication device operates as an NFC reader, the antenna may act as a filter, and if the Q-factor is above a predetermined threshold (for instance, a Q-factor of 30±10%), the antenna may cut-off the desired frequencies transmitted by the tag.

Thus, in order to maintain the Q-factor of the antenna within a certain limit, damping resistors may be employed in the matching network as shown in FIG. 2B. Specifically, FIG. 2B illustrates according to an embodiment, a differential antenna configuration of the communication device.

As shown in FIG. 2B, an NFC controller 260 communicates with a matching network 270, to which an antenna 280 is coupled in a differential manner. The operation of the NFC controller 260, the two output transmit ports 261a and 261b, and the capacitors 272, 274, 276, 278 and 279 is similar to the corresponding parts as explained with reference to FIG. 2A. However, in order to reduce the Q-factor of the antenna 280, damping resistors 263 and 264 are connected directly at one end to the two transmit ports 261a and 261b, respectively, and at the other ends to the capacitors 272 and 274, respectively, as shown in FIG. 2B.

According to one embodiment, a user of the communication device 100 may come in direct contact with the antenna that is looped around a battery compartment of the communication device. In doing so, the performance of the antenna may deteriorate. Accordingly, in order to avoid severe antenna degradation, the antenna may be coupled to the matching network in a single ended fashion.

Figure 3:
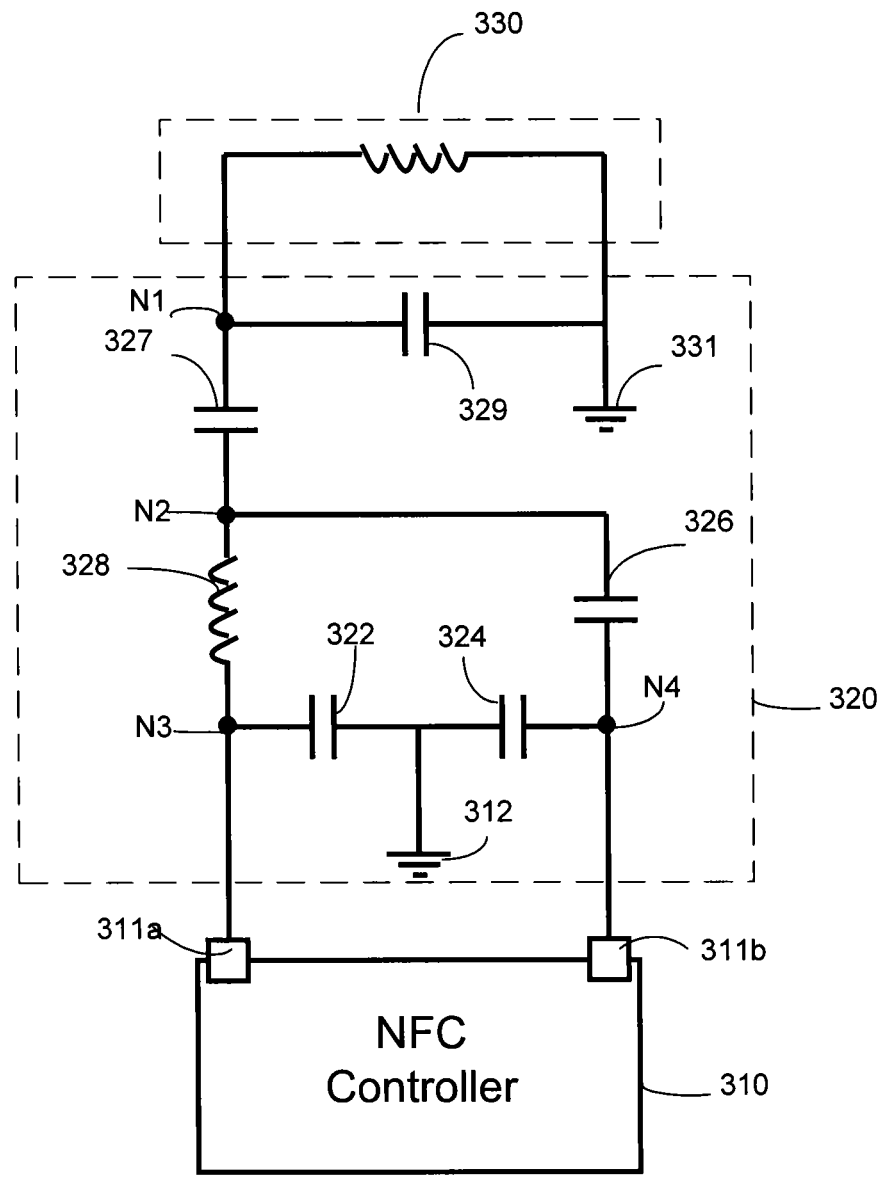
FIG. 3 depicts according to an embodiment, a single-ended NFC antenna configuration.

FIG. 3 illustrates an exemplary antenna configuration, wherein antenna 330 is coupled to a matching network 320 in a single ended fashion. Specifically, one end of the antenna 330 is connected to the matching network 320 at a node labelled N1, and connected to a ground terminal 324 at the other end. The matching network 320 is coupled to an NFC controller 310 at the two transmit output ports 311a and 311b in a differential manner. Thus, the matching network 320 is coupled to the NFC controller 310 in a differential manner and to the antenna 330 in a single ended fashion. Thus, the matching network 320 transforms a differential impedance to a single-ended impedance via the capacitors 327 and 326 and inductor 328. Specifically, the matching network of FIG. 3 includes capacitive as well as inductive elements.

The matching network 320 includes a pair of capacitors 322 and 324 connected at one end to a ground terminal 312 and connected at their respective other ends to nodes N3 and N4, respectively. The capacitors 322 and 324 function as a low pass filter. Further, the matching network 320 includes the inductor 328 connected between nodes N2 and N3, and a capacitor 326 connected between nodes labelled N2 and N4 respectively. Additionally, the matching network includes a capacitor 327 that is connected in series to a parallel configuration of the antenna 330 and capacitor 329. Thus, in this manner the matching network transforms/converts differentially matched impedance to a single ended impedance match. Moreover, it must be appreciated that in the above described embodiments, specific values for the capacitors, inductors, and resistors may be computed based on the desired Q-factor of the antenna.

Figure 4:
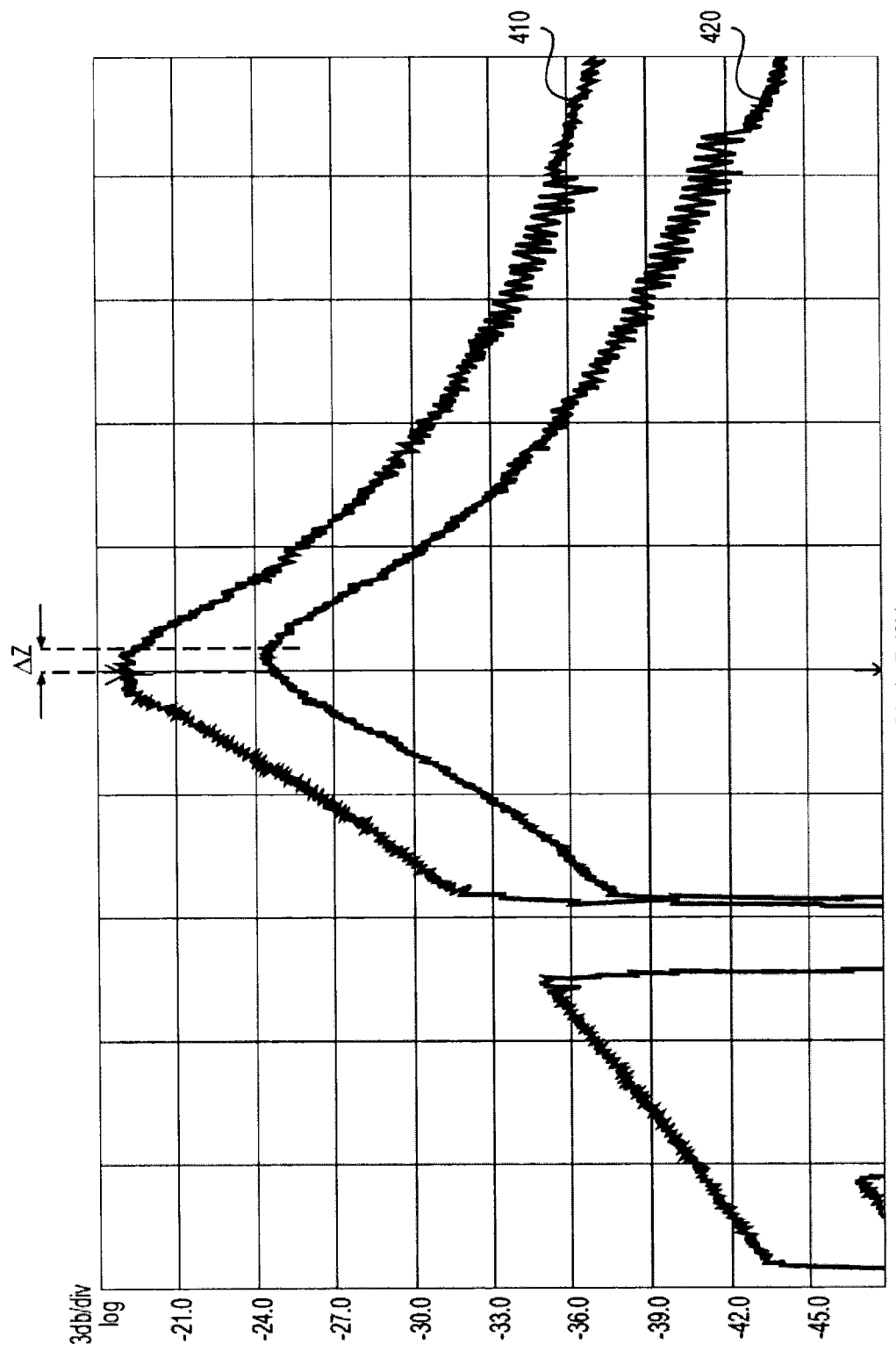
FIG. 4 depicts according to an embodiment, a graph depicting the performance of an NFC analog front end.

FIG. 4 depicts according to an embodiment, a graph depicting the performance of the NFC analog front end of the communication device 100 in an NFC environment. Specifically, the performance (i.e., frequency response) of the communication device equipped with a plastic back cover (a protective back casing) is depicted by curve 410, whereas the performance of the communication device equipped with a metallic back cover is depicted by curve 420.

An NFC environment provides wireless communication of information, such as commands and/or data, among a first NFC device and a second NFC device that are sufficiently proximate to each other. The first NFC device and/or the second NFC device may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure.

According to one embodiment, NFC communication between NFC devices can have one of three modes: a reader/writer mode (R/W), a peer-to-peer (P2P) communication mode, and card emulation (CE) mode. In the R/W mode, a reader/writer can collect and write information on a smart tag. The tag is essentially an integrated circuit containing data, connected to an antenna. In the CE mode of operation, an NFC device appears to a reader like a contactless payment card or contactless transportation card.

In the P2P communication mode, the first NFC device and the second NFC device may be configured to operate according to an active communication mode and/or a passive communication mode. The first NFC device modulates its corresponding information onto a first carrier wave, referred to as a modulated information communication, and generates a first magnetic field by applying the modulated information communication to a first antenna to provide a first information communication. The first NFC device ceases to generate the first magnetic field after transferring its corresponding information to the second NFC device in the active communication mode. Alternatively, in the passive communication mode, the first NFC device continues to apply the first carrier wave without its corresponding information, referred to as an un-modulated information communication. The first NFC device is sufficiently proximate to the second NFC device such that the first information communication is inductively coupled onto a second antenna of the second NFC device. The second NFC device demodulates the first information communication to recover the information. The second NFC device may respond to the information by modulating its corresponding information onto a second carrier wave and generating a second magnetic field by applying this modulated information communication to the second antenna to provide a second information communication in the active communication mode. Alternatively, the second NFC device may respond to the information by modulating the second antenna with its corresponding information to modulate the first carrier wave to provide the second information communication in the passive communication mode.

In the R/W communication mode, the first NFC device is configured to operate in an initiator, or reader, mode of operation and the second NFC device is configured to operate in a target, or tag, mode of operation. However, this example is not limiting, those skilled in the relevant art(s) will recognize that the first NFC device may be configured to operate in the tag mode and the second NFC device may be configured to operate as in the reader mode in accordance with the teachings herein without departing from the spirit and scope of the present disclosure.

FIG. 4 depicts the frequency response of a communication device having an NFC antenna configuration as depicted in FIG. 1. In FIG. 4, curve 410 corresponds to the performance of the communication device that includes a plastic back cover and curve 420 corresponds to the performance of the communication device equipped with a metallic back cover. Moreover, the performance for both the plastic and metallic back covers is evaluated for the same matching network.

From FIG. 4, it can be observed that the communication device with a plastic back cover has a better peak performance (curve 410) than the communication device with a metallic back cover (curve 420). However, in the case of the communication device equipped with the metallic back cover, the strength of the magnetic field is strong enough to perform effective near field communication. Further, a tuning spread parameter, defined herein as a frequency range between the peaks of the curves 410 and 420 respectively, and denoted as $\Delta z$ in FIG. 4 is small (approximately 100 kHz). Thus, the two types of back covers can be interchanged freely by a user of the communication device without significant impact on the NFC performance.

Additionally, the quality factor (Q factor) of the antenna is low. Note that the parameter Q factor indicates how well the NFC antenna performs at its resonance frequency. Normally, the Q factor should be as high as possible, as most power is radiated in that case. However, according to one embodiment, the Q factor of the NFC antenna is low (approximately 30), as the NFC antenna may act as a filter and having a high Q factor may imply that the antenna will filter modulated frequencies transmitted from another NFC communication device, thereby degrading the performance of the NFC system.

Therefore, for the cases of the communication device including a plastic or a metallic back cover, the tuning spread as well as the Q factor is low. Further, the magnetic field surrounding the communication device is sufficiently strong such that transactions (NFC communication) can be executed both, in front of the communication device as well as from the back of the communication device. For instance, according to one embodiment, the communication device including the above described NFC antenna configuration can perform NFC transactions at distances of approximately 130 millimeters.

Figure 5:
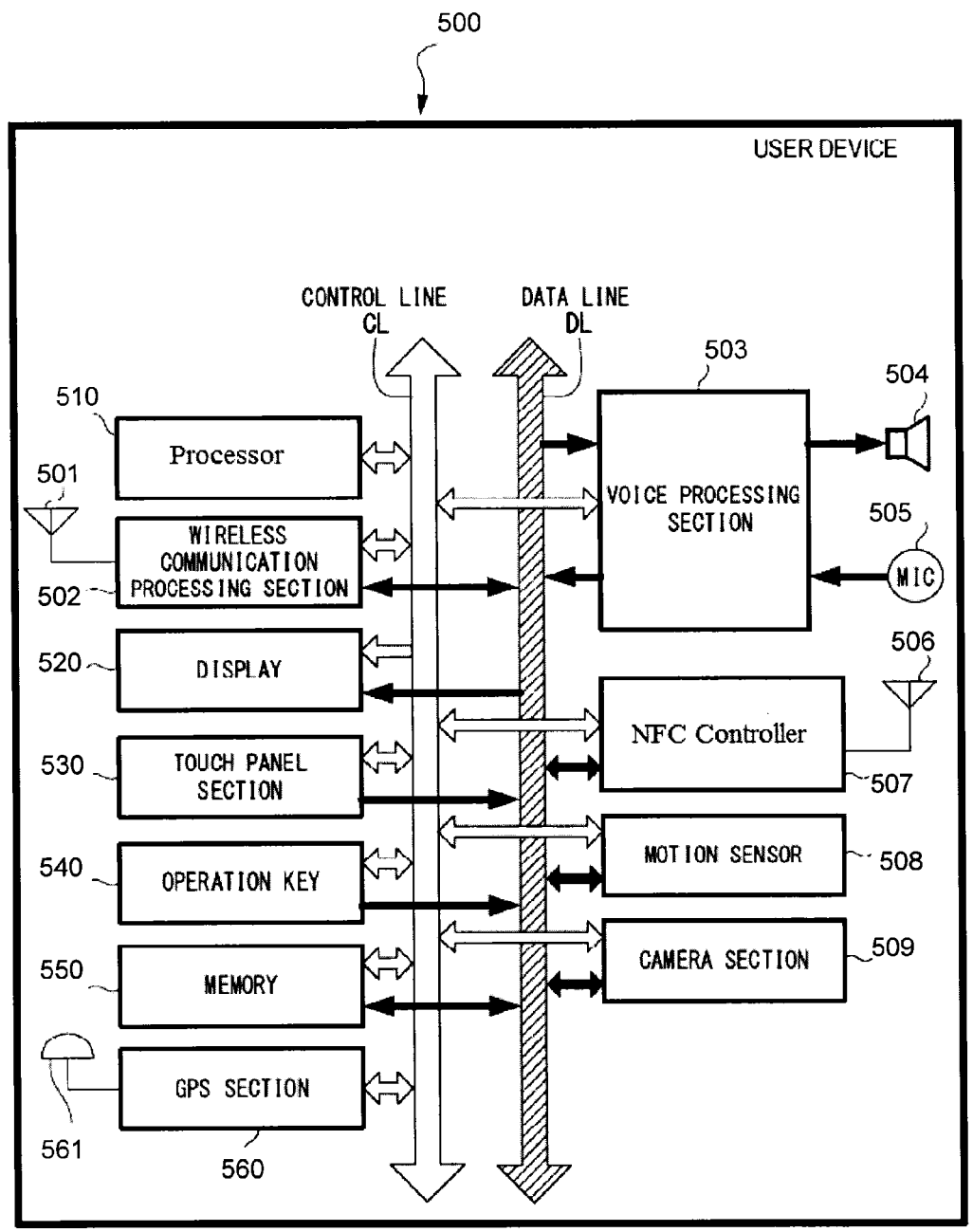
FIG. 5 depicts an exemplary communication device.

FIG. 5 depicts a detailed block diagram illustrating an exemplary communication device 500 according to certain embodiments of the present disclosure. In certain embodiments, the communication device 500 may be a mobile device, tablet, or a smartphone. However, the skilled artisan will appreciate that the features described herein may be adapted to be implemented on other devices (e.g., a laptop, a tablet, a server, an e-reader, a camera, a navigation device, etc.). The exemplary mobile device 500 of FIG. 5 includes a central processing unit (CPU) i.e., a processor 510. Each of the functions of the described embodiments may be implemented by one or more processing circuits. A processing circuit includes a programmed processor as a processor includes circuitry. A processing circuit may also includes devices such as an application-specific integrated circuit (ASIC) and circuit components that are arranged in a specific configuration so as to perform the recited functions. Moreover, the processing circuitry 510 may be included in the communication device 500 as a dedicated component and/or be included in an NFC controller 508 of the communication device 500. Further, the communication device includes a wireless communication processor 502 connected to an antenna 501. A speaker 504 and a microphone 505 are connected to a voice processor 503.

The CPU 510 may include one or more central processing units (CPUs), and may control each element in the user device 500 to perform functions related to communication control, audio signal processing, control for the audio signal processing, still and moving image processing and control, and other kinds of signal processing. The CPU 510 may perform these functions by executing instructions stored in a memory 550. Alternatively or in addition to the local storage of the memory 550, the functions may be executed using instructions stored on an external device accessed on a network or on a non-transitory computer readable medium. The CPU 510 may execute instructions allowing the CPU to perform near field communication as described in FIG. 1.

The memory 550 is an example of the storage unit and includes but is not limited to Read Only Memory (ROM), Random Access Memory (RAM), or a memory array including a combination of volatile and non-volatile memory units. The memory 550 may be utilized as working memory by the CPU 510 while executing the processes and algorithms of the present disclosure. Additionally, the memory 550 may be used for long-term storage, e.g., of image data and information related thereto.

The mobile device 500 includes a control line CL and data line DL as internal communication bus lines. Control data to/from the CPU 510 may be transmitted through the control line CL. The data line DL may be used for transmission of voice data, display data, etc.

The antenna 501 transmits/receives electromagnetic wave signals between base stations for performing radio-based communication, such as the various forms of cellular telephone communication. The wireless communication processor 502 controls the communication performed between the mobile device 500 and other external devices via the antenna 501. For example, the wireless communication processor 502 may control communication between base stations for cellular phone communication.

The speaker 504 emits an audio signal corresponding to audio data supplied from the voice processor 503. The microphone 505 detects surrounding audio and converts the detected audio into an audio signal. The audio signal may then be output to the voice processor 503 for further processing. The voice processor 503 demodulates and/or decodes the audio data read from the memory 550 or audio data received by the wireless communication processor 502 and/or a NFC controller 507. Additionally, the voice processor 503 may decode audio signals obtained by the microphone 105.

The exemplary mobile device 500 may also include a display 520, a touch panel 530, an operation key 540, and a NFC controller 507 connected to an NFC antenna 506. The display 520 may be a Liquid Crystal Display (LCD), an organic electroluminescence display panel, or another display screen technology. In addition to displaying still and moving image data, the display 520 may display operational inputs, such as numbers or icons which may be used for control of the mobile device 500. The display 520 may additionally display a GUI for a user to control aspects of the mobile device 500 and/or other devices. Further, the display 520 may display characters and images received by the mobile device 500 and/or stored in the memory 550 or accessed from an external device on a network. For example, the mobile device 500 may access a network such as the Internet and display text and/or images transmitted from a Web server.

The touch panel 530 may include a physical touch panel display screen and a touch panel driver. The touch panel 530 may include one or more touch sensors for detecting an input operation on an operation surface of the touch panel display screen. The touch panel 530 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 530 may detect when the stylus approaches/contacts the operation surface of the touch panel display (similar to the case in which a finger is used for the touch operation).

In certain aspects of the present disclosure, the touch panel 530 may be disposed adjacent to the display 520 (e.g., laminated) or may be formed integrally with the display 520. For simplicity, the present disclosure assumes the touch panel 530 is formed integrally with the display 520 and therefore, examples discussed herein may describe touch operations being performed on the surface of the display 520 rather than the touch panel 530. However, the skilled artisan will appreciate that this is not limiting.

For simplicity, the present disclosure assumes the touch panel 530 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 530 may include transparent electrode touch sensors arranged in the X-Y direction on the surface of transparent sensor glass.

The touch panel driver may be included in the touch panel 530 for control processing related to the touch panel 530, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor.

The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 530 may detect a position of a user's finger around an edge of the display panel 520 (e.g., gripping a protective case that surrounds the display/touch panel). Signals may be transmitted by the touch panel driver, e.g. in response to a detection of a touch operation, in response to a query from another element based on timed data exchange, etc.

The touch panel 530 and the display 520 may be surrounded by a protective casing, which may also enclose the other elements included in the mobile device 500. In certain embodiments, a position of the user's fingers on the protective casing (but not directly on the surface of the display 520) may be detected by the touch panel 530 sensors. Accordingly, the CPU 510 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the CPU 510 may be configured to detect which hand is holding the mobile device 500, based on the detected finger position. For example, the touch panel 530 sensors may detect a plurality of fingers on the left side of the device 500 (e.g., on an edge of the display 520 or on the protective casing), and detect a single finger on the right side of the device 500. In this exemplary scenario, CPU 510 may determine that the user is holding the device 500 with his/her right hand because the detected grip pattern corresponds to an expected pattern when the device 500 is held only with the right hand.

The operation key 540 may include one or more buttons or similar external control elements, which may generate an operation signal based on a detected input by the user. In addition to outputs from the touch panel 530, these operation signals may be supplied to the CPU 510 for performing related processing and control. In certain aspects of the present disclosure, the processing and/or functions associated with external buttons and the like may be performed by the CPU in response to an input operation on the touch panel 530 display screen rather than the external button, key, etc. In this way, external buttons on the mobile device 500 may be eliminated in lieu of performing inputs via touch operations, thereby improving water-tightness.

The NFC antenna 506 may transmit/receive electromagnetic wave signals to/from other external apparatuses, and the NFC controller 507 may control NFC performed between the other external apparatuses. Additionally, communication protocols such as Bluetooth, IEEE 802.11, may be used for inter-device communication.

The mobile device 500 may include a motion sensor 508. The motion sensor 508 may detect features of motion (i.e., one or more movements) of the mobile device 500. For example, the motion sensor 508 may include an accelerometer to detect acceleration, a gyroscope to detect angular velocity, a geomagnetic sensor to detect direction, a geo-location sensor to detect location, etc., or a combination thereof to detect motion of the device 500. In certain embodiments, the motion sensor 508 may generate a detection signal that includes data representing the detected motion. For example, the motion sensor 508 may determine a number of distinct movements in a motion (e.g., from start of the series of movements to the stop, within a predetermined time interval, etc.), a number of physical shocks on the mobile device 500 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the CPU 510, whereby further processing may be performed based on data included in the detection signal. The motion sensor 508 can work in conjunction with a Global Positioning System (GPS) section 560. The GPS section 560 detects the present position of the mobile device 500. The information of the present position detected by the GPS section 560 is transmitted to the CPU 510. An antenna 561 is connected to the GPS section 560 for receiving and transmitting signals to and from a GPS satellite.

The mobile device 500 may include a camera section 509, which includes a lens and shutter for capturing photographs of the surroundings around the device 500. In an embodiment, the camera section 509 captures surroundings of an opposite side of the device 500 from the user. The images of the captured photographs can be displayed on the display panel 520. A memory section saves the captured photographs. The memory section may reside within the camera section 509 or it may be part of the memory 550. The camera section 509 can be a separate feature attached to the mobile device 500 or it can be a built-in camera feature.

The above descriptions are organized as separate embodiments for ease of understanding of the inventive concepts described. However, one of ordinary skill in the art will recognize that the features of one embodiment may be combined with those of another without departing from the scope of the disclosure. Thus, the particular combination of features described in each of the embodiments is merely exemplary and may be combined without limitation to form additional embodiments without departing from the scope of the disclosure. Additionally, it must be appreciated that numerous modifications and variations of the present disclosure are possible in light of the above teachings, for example, the antenna that is disposed around the battery compartment of the communication device may include multiple turns in order to further boost the antenna's magnetic field. It is therefore to be understood that within the scope of the appended claims, the concepts may be practiced otherwise than as specifically described herein.

The invention claimed is:

1. A communication device, comprising:
    circuitry configured to generate a differential signal for communication with an analog front end, wherein the analog front end includes a matching network and an antenna, the antenna being disposed around a boundary of a battery compartment of the communication device, and the matching network comprising
        a first capacitor having a first end directly connected to a first end of the antenna, and a second end directly connected to a second end of the antenna,
        a second capacitor having a first end connected to a ground terminal, and a second end directly connected to a first transmit port of circuitry, and
        a third capacitor having a first end connected to the ground terminal, and a second end directly connected to a second transmit port of the circuitry.

2. The communication device of claim 1, wherein the antenna is a wire that forms a single loop around the battery compartment.

3. The communication device of claim 2, wherein the wire is disposed at a distance of one millimeter away from the boundary of the battery compartment.

4. The communication device of claim 1, wherein the antenna is a trace that is embedded on a printed circuit board of the communication device.

5. The communication device of claim 1, wherein the antenna couples to the matching network in one of a differential fashion and a single ended fashion, and the matching network couples to the circuitry in a differential fashion.

6. The communication device of claim 5, wherein when the antenna couples to the matching network in the differential fashion, both ends of the antenna are symmetrically connected to two ends of the matching network, and when the antenna couples to the matching network in the single ended fashion, one end of the antenna is connected to the matching network and the other end is connected to a ground terminal.

7. The communication device of claim 1, wherein the battery compartment houses a battery of the communication device and, wherein the battery of the communication device does not include an antenna that is disposed on the surface of the battery or is embedded within the battery.

8. The communication device of claim 1, wherein the antenna has an impedance of 50 ohms at a resonance frequency of 13.56 MHz.

9. The communication device of claim 1, wherein the antenna has a quality factor of 30.

10. A communication device comprising:
a protective back casing;
an antenna disposed around a boundary of a battery compartment of the communication device; and
a matching network comprising
a first capacitor having a first end directly connected to a first end of the antenna, and a second end directly connected to a second end of the antenna,
a second capacitor having a first end connected to a ground terminal, and a second end directly connected to a first transmit port of circuitry configured to generate a differential signal for communication with the matching network, and
a third capacitor having a first end connected to the ground terminal, and a second end directly connected to a second transmit port of the circuitry.

11. The communication device of claim 10, wherein the antenna is a wire that forms a single loop around the battery compartment and is disposed at a distance of one millimeter away from the boundary of the battery compartment.

12. The communication device of claim 10, wherein the antenna is a trace that is embedded on a printed circuit board of the communication device.

13. The communication device of claim 10, wherein the matching network couples to the circuitry in a differential fashion and couples to the antenna in one of a differential fashion and a single ended fashion.

14. The communication device of claim 10, wherein the protective back casing is one of a plastic back casing and a metallic back casing.

15. The communication device of claim 10, wherein the antenna has an impedance of 50 ohms at a resonance frequency of 13.56 MHz.

16. The communication device of claim 10, wherein the antenna has a quality factor of 30.

* * * * *